United States Patent
Puttananjegowda et al.

(10) Patent No.: US 12,453,496 B2
(45) Date of Patent: Oct. 28, 2025

(54) SILICON CARBIDE NANOPARTICLES FIBROUS MEMBRANE FOR IMPLANTABLE GLUCOSE SENSOR INTEGRATED WITH CHRONOAMPEROMETRIC POTENTIOSTAT

(71) Applicant: University of South Florida, Tampa, FL (US)

(72) Inventors: Kavyashree Puttananjegowda, Tampa, FL (US); Sylvia Thomas, Orlando, FL (US); Arash Takshi, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 17/335,276

(22) Filed: Jun. 1, 2021

(65) Prior Publication Data
US 2021/0369157 A1  Dec. 2, 2021

Related U.S. Application Data

(60) Provisional application No. 63/033,257, filed on Jun. 2, 2020.

(51) Int. Cl.
*A61B 5/1486* (2006.01)
*A61B 5/145* (2006.01)

(52) U.S. Cl.
CPC ...... *A61B 5/14865* (2013.01); *A61B 5/14532* (2013.01)

(58) Field of Classification Search
CPC .................. A61B 5/14865; A61B 5/14532
See application file for complete search history.

(56) References Cited

U.S. PATENT DOCUMENTS

| | | | |
|---|---|---|---|
| 2008/0176271 A1* | 7/2008 | Silver | A61B 5/413 422/68.1 |
| 2009/0163784 A1* | 6/2009 | Sarpeshkar | H03F 1/342 330/98 |

(Continued)

FOREIGN PATENT DOCUMENTS

KR    20210038823 A  *  4/2021  .............. C25D 3/28

OTHER PUBLICATIONS

Moon, B.U., de Vries, M.G., Westerink, B.H.C. et al. Development and characterization of a microfluidic glucose sensing system based on an enzymatic microreactor and chemiluminescence detection. Sci. China Chem. 55, 515-523 (2012). https://doi.org/10.1007/s11426-012-4557-2 (Year: 2012).*

(Continued)

*Primary Examiner* — Alex M Valvis
*Assistant Examiner* — Grace L Rozanski
(74) *Attorney, Agent, or Firm* — HUSCH BLACKWELL LLP

(57) ABSTRACT

The present disclosure presents glucose monitoring systems and methods. One such system comprises a glucose monitoring sensor having at least a counter electrode, a reference electrode, and a working electrode; and a silicon-carbide-silicon-carbide-nanoparticles-electrospun-nanofibrous-membrane contacting the working electrode. The system further includes a glucose oxidase enzyme solution contacting the silicon-carbide-silicon-carbide-nanoparticles-electrospun-nanofibrous-membrane, wherein a conductive polymer membrane assists in binding the glucose oxidase enzyme composition with the silicon-carbide-silicon-carbide-nanoparticles-electrospun-nanofibrous-membrane. Other systems and methods are also provided.

19 Claims, 16 Drawing Sheets

(56) References Cited

U.S. PATENT DOCUMENTS

| | | | | |
|---|---|---|---|---|
| 2011/0151736 | A1* | 6/2011 | Lee | D04H 1/4242 |
| | | | | 977/773 |
| 2012/0137783 | A1* | 6/2012 | Wang | H10N 30/304 |
| | | | | 29/25.35 |
| 2012/0247976 | A1* | 10/2012 | Yan | G01N 27/4145 |
| | | | | 977/773 |
| 2014/0162870 | A1* | 6/2014 | Wang | B01J 23/892 |
| | | | | 502/100 |
| 2014/0197042 | A1* | 7/2014 | Zhang | G01N 27/3273 |
| | | | | 427/2.12 |
| 2015/0122646 | A1* | 5/2015 | Al-Rubeaan | C12Q 1/003 |
| | | | | 435/177 |
| 2018/0085605 | A1* | 3/2018 | Maharbiz | G01N 27/327 |
| 2022/0041973 | A1* | 2/2022 | Stine | C12M 41/48 |

OTHER PUBLICATIONS

Guo C, Aptamer-Templated Silver Nanoclusters Embedded in Zirconium Metal-Organic Framework for Bifunctional Electrochemical and SPR Aptasensors toward Carcinoembryonic Antigen. ACS Appl Mater Interfaces. Nov. 29, 2017;9(47):41188-41199. doi: 10.1021/acsami.7b14952. Epub Nov. 16, 2017. PMID: 29112366. (Year: 2017).*

Majumdar, Gourab. "Recent technologies and trends of power devices." 2007 International Workshop on Physics of Semiconductor Devices. IEEE, 2007. (Year: 2007).*

Mashkoor Ahmad, Caofeng Pan, Zhixiang Luo, and Jing Zhu; "A Single ZnO Nanofiber-Based Highly Sensitive Amperometric Glucose Biosensor"; The Journal of Physical Chemistry C 2010 114 (20), 9308-9313; DOI: 10.1021/jp102505g (Year: 2010).*

Ghoreishizadeh, et al., "An Integrated Platform for Differential Electrochemical and ISFET Sensing," IEEE International Symposium on Circuits and Systems (ISCAS), Montreal, QC, Canada, 2016, pp. 2875-2878.

Shenoy, et al., "A CMOS Analog Correlator-Based Painless Nonenzymatic Glucose Sensor Readout Circuit," in IEEE Sensors Journal, vol. 14, No. 5, pp. 1591-1599, May 2014.

Ghoreishizadeh, et al., "A Differential Electrochemical Readout ASIC With Heterogeneous Integration of Bio-Nano Sensors for Amperometric Sensing," in IEEE Transactions on Biomedical Circuits and Systems, vol. 11, No. 5, pp. 1148-1159, Oct. 2017.

Nazari, et al., "CMOS Neurotransmitter Microarray: 96-Channel Integrated Potentiostat With On-Die Microsensors," in IEEE Transactions on Biomedical Circuits and Systems, vol. 7, No. 3, pp. 338-348, Jun. 2013.

Parsnejad, et al., "Compact CMOS amperometric readout for nanopore arrays in high throughput lab-on-CMOS," 2016 IEEE International Symposium on Circuits and Systems (ISCAS), 2016, pp. 2851-2854.

Guo, et al., "A 200-Channel Area-Power-Efficient Chemical and Electrical Dual-Mode Acquisition IC for the Study of Neurodegenerative Diseases," in IEEE Transactions on Biomedical Circuits and Systems, vol. 10, No. 3, pp. 567-578, Jun. 2016.

Li, et al., "CMOS Amperometric ADC With High Sensitivity, Dynamic Range and Power Efficiency for Air Quality Monitoring," in IEEE Transactions on Biomedical Circuits and Systems, vol. 10, No. 4, pp. 817-827, Aug. 2016.

Puttananjegowda, et al., "An Electrospun Nanofibrous Membrane Based Electrochemical Glucose Sensor," in IEEE Sensors Letters, vol. 4, No. 2, pp. 1-4, Feb. 2020, Art No. 4500204.

Xiao, et al., "One-step fabrication of bio-functionalized nanoporous gold/poly(3,4-ethylenedioxythiophene) hybrid electrodes for amperometric glucose sensing", Talanta, V116, 2013, pp. 1054-1059.

Jose, et al., "Direct electron transfer in a mediator-free glucose oxidase-based carbon nanotube-coated biosensor", Carbon, V50, Issue 11, 2012, pp. 4010-4020.

Chen, et al., "A Glucose Biosensor Based on Direct Electron Transfer of Glucose Oxidase on PEDOT Modified Microelectrode", J. Electrochemical Soc. V167, No. 6, 2020.

* cited by examiner

| Reference | [1] | [2] | [3] | [4] | [5] | [6] | [7] | Exemplary Potentiostat |
|---|---|---|---|---|---|---|---|---|
| Applications | Biosensor | Biosensor | Biosensor | Biosensor | Biosensor | Biosensor | Gas sensor | Biosensor |
| Technology | CMOS 350 nm | CMOS 350 nm | CMOS 350 nm | CMOS 350 nm | CMOS 0.5 μm | CMOS 180 nm | CMOS 0.5 μm | CMOS 180 nm |
| Sensing Electrode | ISFET | Micro needle | Pt-nanoS | 3D gold | Nanopore | MEA | RTIL arrays | SiCNPs-ENFM |
| Input Current Range | -100 μA-100 μA | 5 μA-30 μA | -20 μA-20 μA | 24 pA-0.35 μA | -10 pA-10 pA | 200 pA-50 nA | 127 nA-16 μA | 2 μA – 200 μA |
| Power Consumption | 9.9 mW | 5.1 mW | 9.3 mW | 0.188 mW | 380 μW | 3.21 mW | 241 μW | 540 μW |
| Supply Voltage | 3.3 V | 1.65 V | 3.3 V | 3.3 V | 3.3 V | 1.8 V | 5 V | 1.8 V |
| Input Referred Noise Current | 150 pA/√Hz | 0.14 μA/√Hz | 0.47 pA/√Hz | 3.1 pA/√Hz | 3 pA/√Hz | 0.48 pA/√Hz | 3.1 pA/√Hz | 11 fA/√Hz |

TABLE 1

References:

[1] - S.G. Sara, G. Pantelis, C. Sandro, and D.M. Giovanni, "An Integrated Platform for Differential Electrochemical and ISFET Sensing," IEEE International Symposium on Circuits and Systems (ISCAS), Montreal, QC, Canada, 2016, pp. 2875-2878.

[2] - V. Shenoy, J. Sungyong, Y. Youngsam, P. Youngjin, K. Hyoungsoo, and J.C. Hoon, "A CMOS Analog Correlator-Based Painless Nonenzymatic Glucose Sensor Readout Circuit," IEEE Sensors Journal, Vol. 14, No. 5, pp. 1591-1599, 2014.

[3] - S.G. Sara, T. Irene, D. M. Giovanni, C. Sandro, and G. Pantelis, "A Differential Electrochemical Readout ASIC With Heterogeneous Integration of Bio-Nano Sensors for Amperometric Sensing," IEEE Trans. Biomedical Circuits Syst., Vol. 11, No. 5, pp. 1148-1159, 2017.

[4] - H. N. Meisam, M. J. Harred, L. Lian, G. Axel, and G. Roman, "CMOS Neurotransmitter Microarray: 96-Channel Integrated Potentiostat With On-Die Microsensors," IEEE Trans. Biomed. Circuits Syst., Vol. 7, No. 3, pp. 338-348, 2013.

[5] - P. Sina, L. Haitao, and J. M. Andrew, "Compact CMOS Amperometric Readout for Nanopore Arrays in High Throughput Lab-on-CMOS," IEEE International Symposium on Circuits Syst., (ISCAS), Montreal, QC, Canada, 2016, pp. 2851-2854.

[6] - J. Guo, W. Ng, J. Yuan, S. Li, and M. Chan, "A 200-Channel Area-Power-Efficient Chemical and Electrical Dual-Mode Acquisition IC for the Study of Neurodegenerative Diseases," IEEE Trans. Biomed. Circuits and Systems, Vol. 10, No. 3, pp. 567-578, 2016.

[7] - H. Li, C. S. Boling, and A. J. Mason, "CMOS Amperometric ADC With High Sensitivity, Dynamic Range and Power Efficiency for Air Quality Monitoring," IEEE Trans. Biomed. Circuits and Systems, Vol. 10, No. 4, pp. 817-827, 2016.

FIG. 10A

| Reference | [8] | [9] | [10] | [11] | Exemplary Glucose Sensor |
|---|---|---|---|---|---|
| Sensing Electrode | Au/PEDO:PSS-ENFM/GOx | NPG/PEDOT/GOx | MWCNT/Au/GOx | CF-PEDOT-NFs/GOx | Au/SiCNPs-PEDOT:PSS/PVDF/ GOx |
| Nano Materials | N/A | NPG | MWCNT | CF | SiCNPs |
| Concentration Range | 0 mM – 25 mM | 0.1 – 15 mM | 0 – 30 mM | 0.5 – 15 mM | 0.5 – 20 mM |
| Limit of Detection | 2.3 µM | 10 mM | 4 µM | 6.5 mM | 0.56 µM |
| Sensitivity | 5.11 µA/mM cm$^2$ | 7.3 µA/mM cm$^2$ | 0.47 µA/mM cm$^2$ | 8.5 µA/mM cm$^2$ | 30.75 µA/mM cm$^2$ |
| Number of Days | 50 days | 7 days | 14 days | 60 days | 50 days |

TABLE 2

References:

[8] - K. Puttananjegowda, A. Takshi, S. Thomas, "Electrospun Nanofibrous Membrane Based Electrochemical Glucose Sensor," IEEE Sensors Lett., Vol. 4, No. 2, pp. 1-4, 2020.

[9] - X. Xiao, M. Wang, H. Li, and P. Si, "One-Step Fabrication of Bio-Functionalized Nanoporous Gold/Poly(3,4 Ethylenedioxythiophene) Hybrid Electrodes for Amperometric Glucose Sensing," Talanta, Vol. 116, pp. 1054-1059, Nov. 2013.

[10] - M. V. Jose, S. Marx, H. Murata, R. R. Koepsel, and A. J. Russell, "Direct Electron Transfer in a Mediator-Free Glucose Oxidase-Based Carbon Nanotube-Coated Biosensor," Carbon, Vol. 50, No. 11, pp. 4010-4020, 2012.

[11] - J. Chen et al., "A Glucose Biosensor Based on Direct Electron Transfer of Glucose Oxidase on PEDOT Modified Microelectrode", J. Electrochem. Soc., Vol. 167, 1-9, 2020.

SILICON CARBIDE NANOPARTICLES FIBROUS MEMBRANE FOR IMPLANTABLE GLUCOSE SENSOR INTEGRATED WITH CHRONOAMPEROMETRIC POTENTIOSTAT

CROSS-REFERENCE TO RELATED APPLICATION

This application claims priority to U.S. provisional application entitled, "SILICON CARBIDE NANOPARTICLES FIBROUS MEMBRANE FOR IMPLANTABLE GLUCOSE SENSOR INTEGRATED WITH CHRONO-AMPEROMETRIC POTENTIOSTAT FOR CONTINUOUS BLOOD GLUCOSE MONITORING SYSTEMS," having Ser. No. 63/033,257, filed Jun. 2, 2020, which is entirely incorporated herein by reference.

BACKGROUND

Considerable progress has been made in the development of highly sensitive, highly durable, low-cost, point-of-care and accurate biosensors. For example, silicon carbide (SiC) is a biocompatible material has been used for clinical studies of glucose sensors in addition to bone prosthetics, heart stents, etc. which demonstrates the biocompatibility of these forms of SiC. In general, glucose sensors are an important part of managing diabetes mellitus and are featured in continuous glucose monitoring systems to measure the glucose concentration of a blood in a patient. To be truly beneficial, a glucose sensor must be able to function properly for an extended period of time. Ideally, a continuous glucose monitoring system needs to be power efficient, compact, portable, sensitive, and have a linear response for targeted levels. However, critical issues of a glucose sensor limit the device's longevity, sensitivity, and biocompatibility.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 10A shows a table ("Table 1") comparing an exemplary chronoamperometric potentiostat performance with prior state-of-the-art potentiostats in accordance with various embodiments of the present disclosure.

FIG. 10B shows a table ("Table 2") comparing an exemplary glucose sensor with prior state-of-the-art glucose sensor in accordance with various embodiments of the present disclosure.

DETAILED DESCRIPTION

Figure 1:
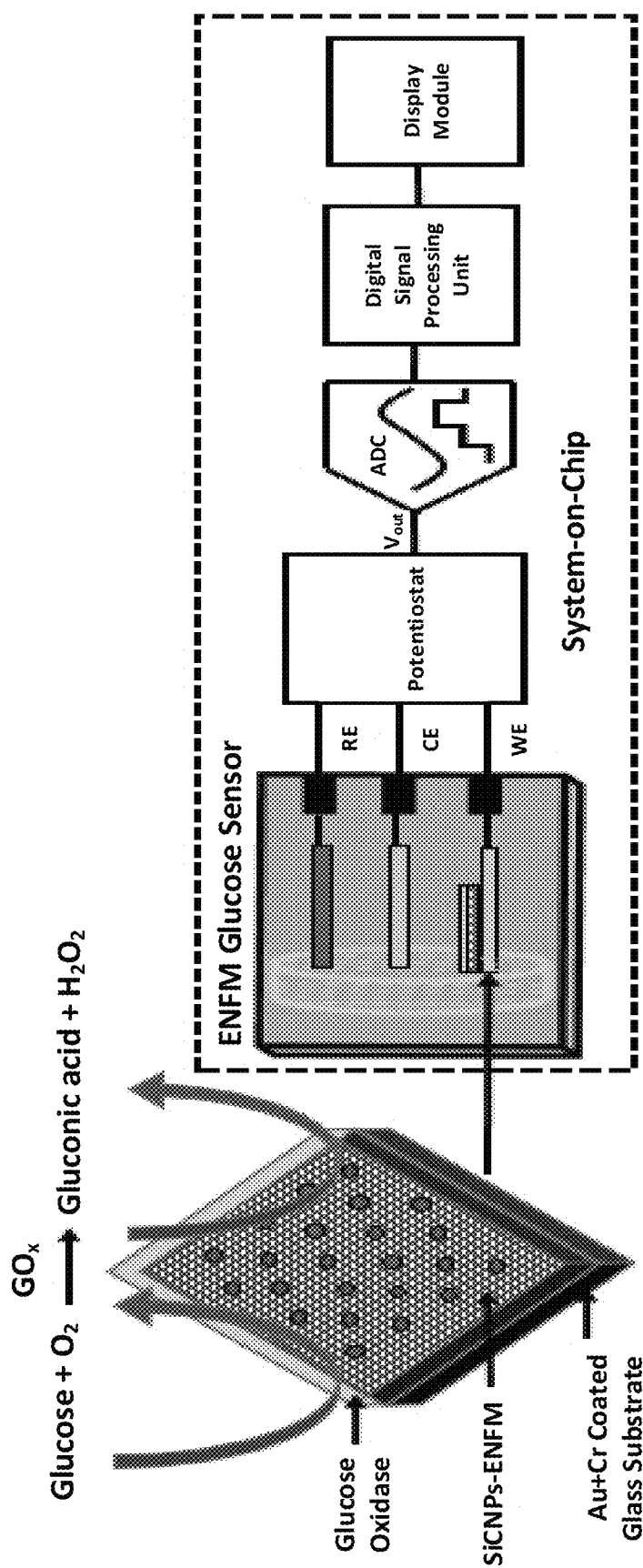
FIG. 1 shows a pictorial representation of an exemplary silicon-carbide-nanoparticles-electrospun-nanofibrous-membrane (SiCNPs-ENFM) based glucose sensor with the integration of a chronoamperometric potentiostat for a continuous blood glucose monitoring system in accordance with various embodiments of the present disclosure.

The present disclosure describes various embodiments of systems, apparatuses, and methods of glucose monitoring using silicon-carbide-nanoparticles-electrospun-nanofibrous-membrane (SiCNPs-ENFM) glucose sensors. In various embodiments, such SiCNPs-ENFM glucose sensors are integrated with a chronoamperometric potentiostat for continuous blood glucose monitoring systems.

In general, electrochemical enzymatic biosensors have become popular for point-of-care monitoring of glucose levels in the blood by receiving a sample and processing the sample to determine an analyte concentration using the glucose monitoring sensor. In certain embodiments, the sample is, but not limited to, a blood sample and the analyte is glucose. For example, in alternative embodiments, the sample may be interstitial fluid.

The sensitivity of these biosensors can be significantly enhanced by the utilization of nanostructures in sensor fabrication. More specifically, silicon-carbide-nanoparticles (SiCNPs) with conductive polymer (CP) poly(3,4-ethylenedioxythiophene):poly(styrene sulfonate) (PEDOT:PSS) based electrospun-nanofibrous-membrane (ENFM) can increase detection, sensitivity, provide larger surface-to-volume catalyst loading, and create a platform for effective enzyme binding. Advantageously, SiCNPs-ENFMs are easily fabricated, cost effective, and can be tailored to detect a wide range of biochemical reactions with the appropriate materials and functionalization. Accordingly, the present disclosure presents various embodiments of an integrated system with a CMOS based low-power, low-noise chronoamperometric potentiostat circuit and SiCNPs-ENFM based glucose sensor on a single chip.

During testing and analysis, an exemplary sensing unit is observed to be capable of detecting an electrochemical current ranging from 2 μA to 200 μA from a SiCNPs-ENFM glucose sensor working electrode with a high sensitivity of 30.75 μA/mM cm$^2$, better limit of detection (LOD) of 0.56 μM, and improved durability for over 50 days over prior systems. An exemplary chronoamperometric potentiostat (having a constant reference current generator, voltage control unit, and a transimpedance amplifier (TIA)) can be implemented using a multi-stage difference-differential telescopic cascode operational amplifier (OpAmp) configuration. As demonstrated through simulation results, the configuration is capable of achieving a low-noise of 11 fA/√Hz, a high gain of 78 dB, and a stability of 65° phase margin with a 10 kHz bandwidth and a low-power consumption of 540 μW for a 1.8 V supply compared to existing potentiostats. The integration of a SiCNPs-ENFM glucose sensor with a chronoamperometric potentiostat provides the basis for future wearable and portable biosensors.

Among various conductive polymers (CP), poly(3,4-ethylenedioxythiophene):poly(styrene sulfonate) (PEDOT:PSS) thin-films have been studied widely, due to higher enzyme immobilization capability, good electrical conductivity, better processability, excellent electrochemical stability, reliability, and biocompatibility. In addition to the use of a conductive polymer material, the surface structure also contributes to the effective immobilization of the enzyme. Of particular interest is the utilization of electrospun nanofibrous structures, which offer a large surface area, high porosity, biocompatibility, and dimensionality advantages, leading to better binding of the enzyme with the electrode for efficient electron-transfer and higher sensitivity.

In accordance with the present disclosure, fabrication, morphological, and electrochemical characterization of a glucose oxides (GOx) enzyme entrapped in SiCNPs with PEDOT:PSS CP electrospun-nanofibrous-membrane (ENFM) based glucose sensing electrodes were measured and simulated using a chronoamperometric potentiostat circuit in 180 nm CMOS technology. The SiCNPs-ENFM exhibits higher sensitivity, quick response time, better limit of detection and durability compared to spin-coated-thin-film (SCTF) electrodes. It has been shown that conducting polymers can be utilized as a mediator for the detection of glucose. This is presumably due to a direct electron transfer between glucose oxidase and the CP, which is an oxygen-independent detection. The present disclosure studies the feasibility of using a SiCNPs-ENFM electrode for fabricating glucose sensors with the integration of a chronoamperometric potentiostat. An exemplary sensing system, in accordance with embodiments of the present disclosure, achieves competitive performance in terms of low-noise, high gain, increased linearity and stability with a significantly lower-power compared to the prior state-of-the-art potentiostats. As shown in FIG. 1, an exemplary chronoamperometric potentiostat can be equipped with a SiCNPs-ENFM glucose sensor and be integrated with an analog to digital converter (ADC) & a digital signal processing circuit for a compact, portable, and wearable device in the form of a system-on-chip (SOC). The figure shows the SiCNPs-ENFM glucose sensor being coupled to a potentiostat via reference (RE), counter (CE), and working (WE) electrodes, in which a voltage output ($V_{out}$) of the potentiostat is coupled to an analog to digital converter (ADC) that is coupled to a digital signal processing unit. In various embodiments, the digital signal processing unit is configured to process the digital signal and obtain a glucose measurement that is displayed in a display module coupled to the digital signal processing unit. As the figure shows, in an exemplary embodiment, the SiCNPs-ENFM sensing electrode or working electrode component of the glucose sensor can be composed of an Au+Cr coated glass substrate integrated with layers of SiCNP-ENFM and glucose oxidase (GOx) such that the presence of GOx catalyzes the oxidation of glucose to produce Gluconic acid and hydrogen peroxide ($H_2O_2$).

In various embodiments, the fabrication of an electrospun conducting polymer (CP) of PEDOT:PSS with addition of a SiCNPs nanofiber based glucose sensor involves the following process steps. First, the solution for electrospinning is prepared by dissolving 1.18 g of polyvinylidene fluoride (PVDF) in 2 mL of tetrahydrofuran (THF), adding 0.05 g of SiCNPs and 0.2 g of PEDOT:PSS followed by vigorous stirring for 1 hour at 60° C. The resulting mixture is electrospun using the following parameters: single 18 gauge syringe nozzle; applied voltage of 20 kV; and a flow rate of 15 μL min$^{-1}$. The distance from the tip to the collector plate is fixed at 32 cm, and a rotating mandrel is used to collect a bead free fibrous matrix, which helps the uniform distribution of fibers on the electrode surface. The gold (Au) coated glass substrate is affixed on to the mandrel surface and the mandrel is rotated at 54 RPM. After the fibers are spun on the gold surface for an area of 0.35 cm×0.5 cm, the SiCNPs-ENFM electrode are dried at 70° C. for 4 hours. The GOx enzyme solution of 1.5 mg may then be drop casted over the nanofibrous membrane electrode. For enzyme immobilization to occur, the electrodes are kept at 4° C. for 24 hours.

Figure 2A:
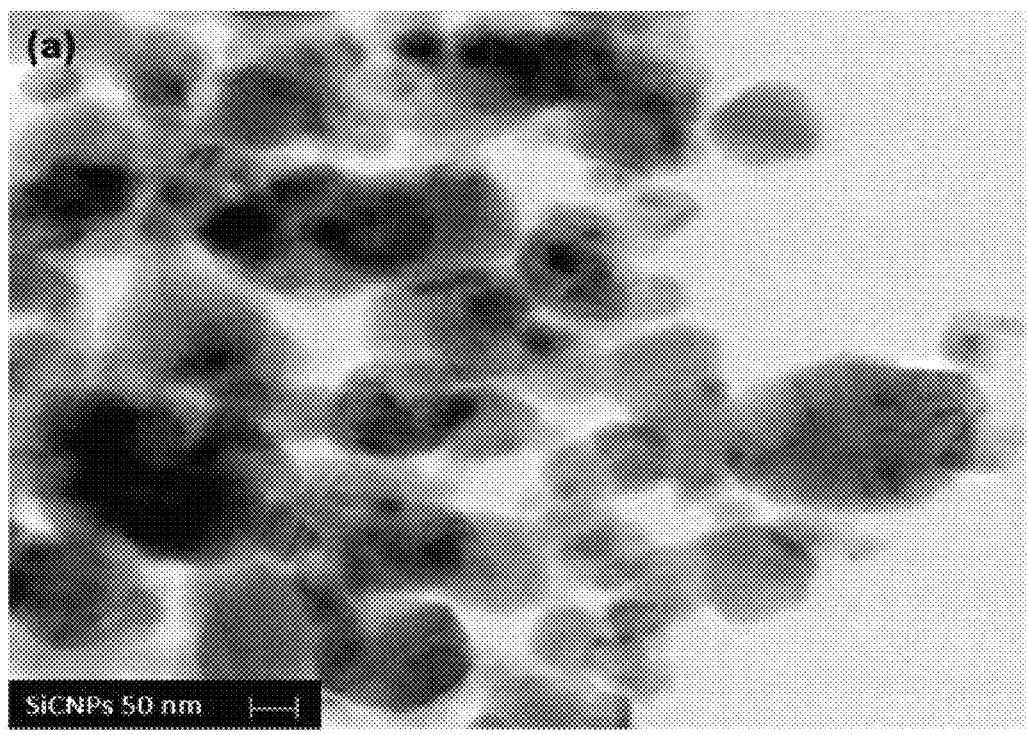
FIGS. 2A-2D show (A) a transmission electron microscope (TEM) image of SiCNPs, (B) an EDX (Energy Dispersive X-ray Spectroscopy) spectrum of SiCNPs, (C) a scanning electron microscope (SEM) images of electrospuned poly(3,4-ethylenedioxythiophene):poly(styrene sulfonate) (PEDOT:PSS)+SiCNPs nanofibers without glucose oxide (GOx), and (D) an SEM image of an electrospuned PEDOT:PSS+SiCNPs nanofibers with GOx in accordance with various embodiments of the present disclosure.
Figure 2B:
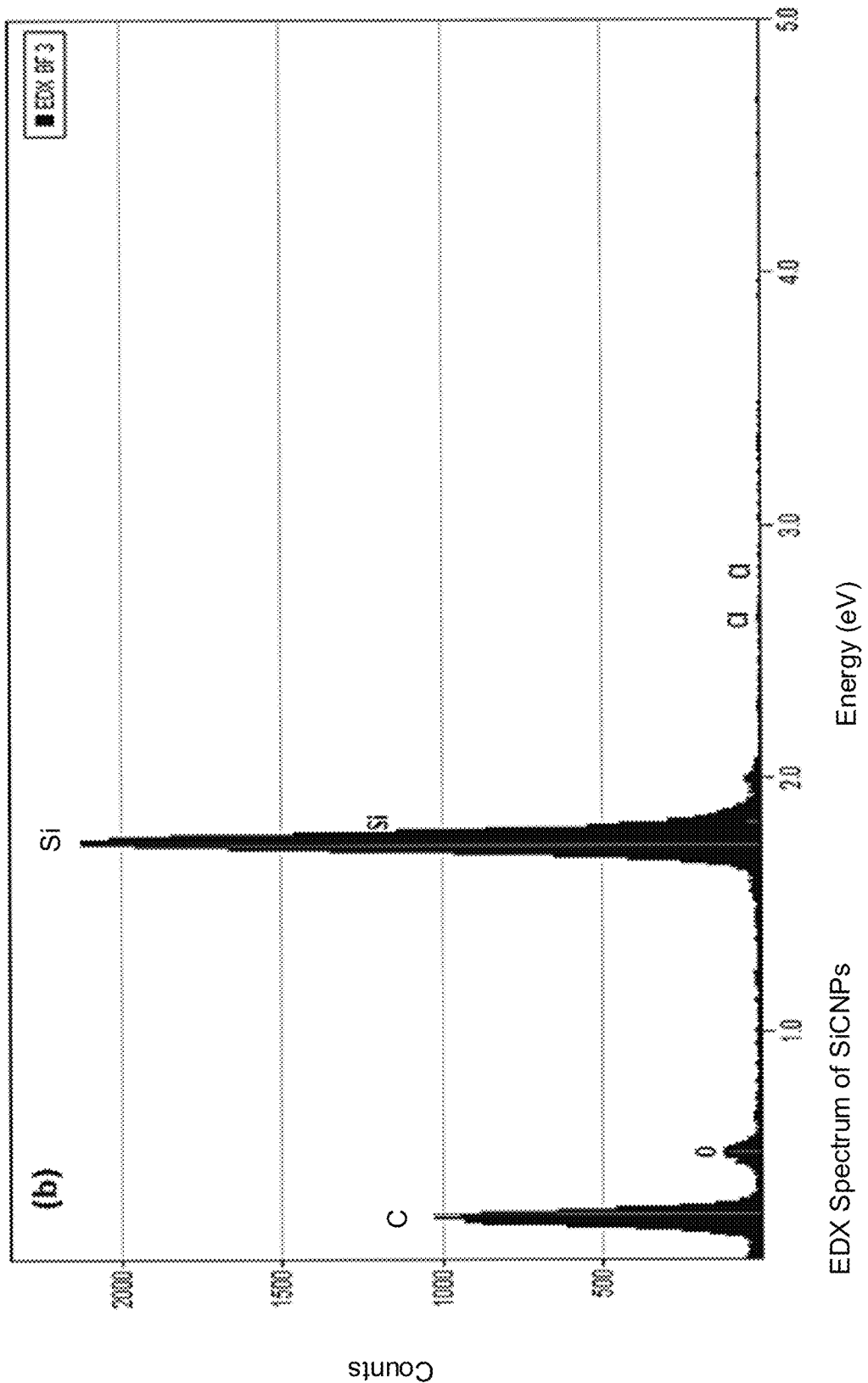
Figure 2C:
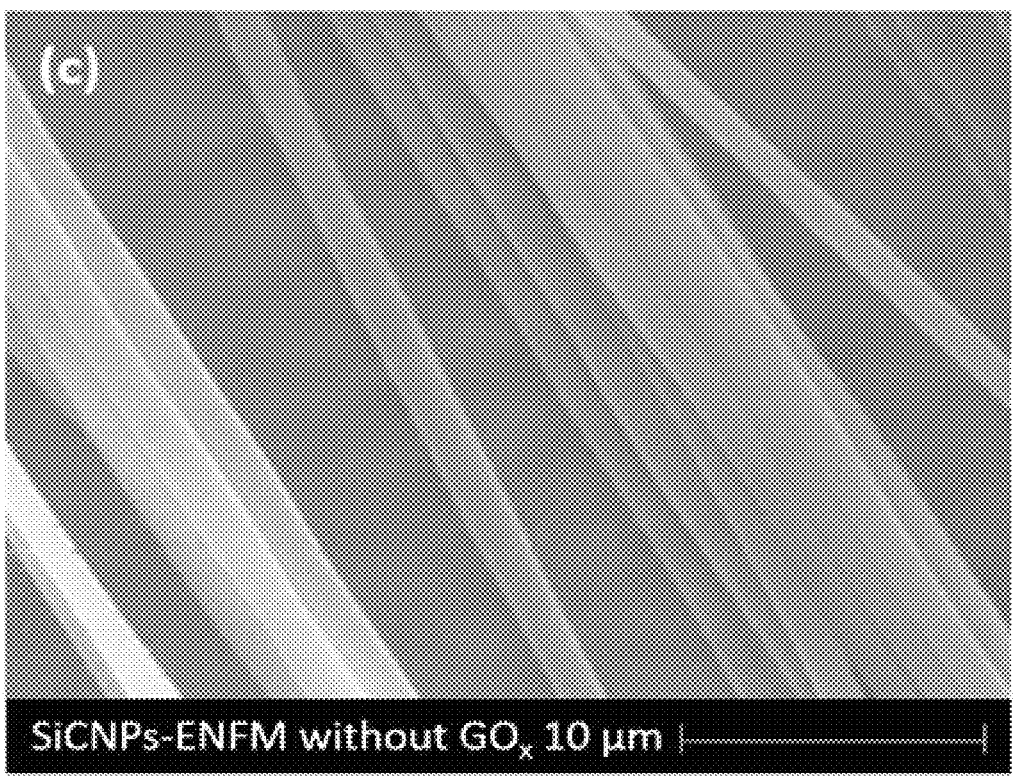
Figure 2D:
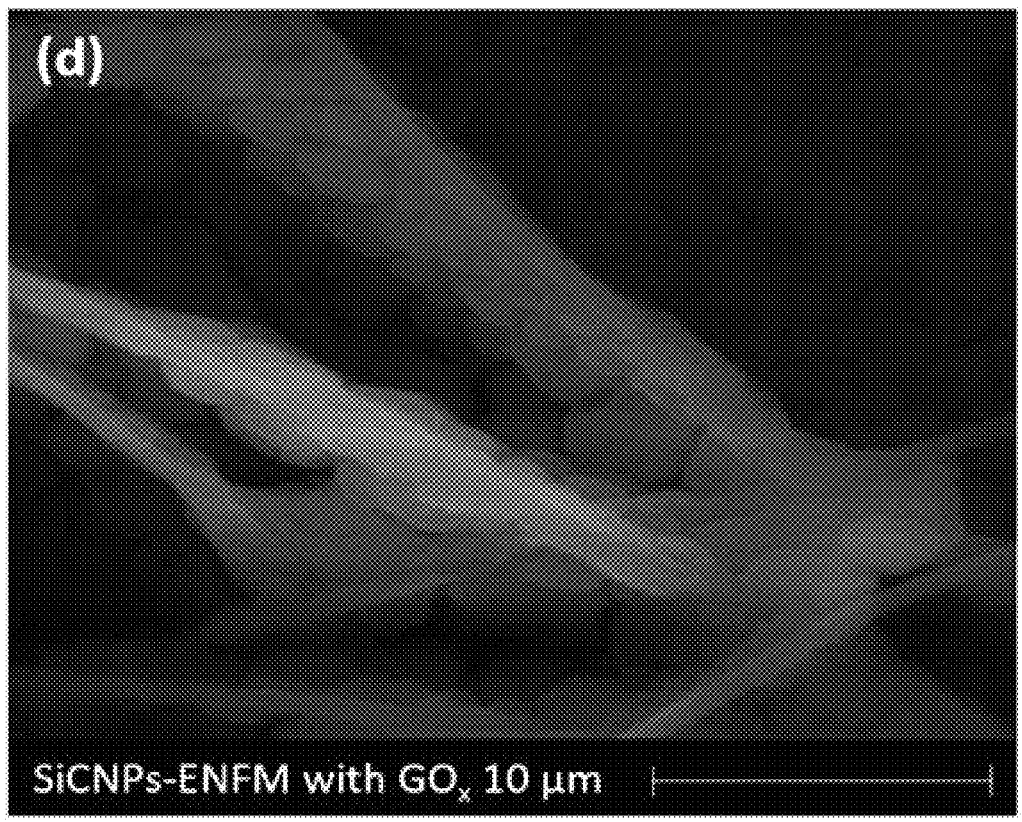

First, to characterize the morphology of SiCNPs, a transmission electron microscopy (TEM, Tecnai TF20) was used with a 50 nm scale bar and it's EDX spectrum graph is shown in FIGS. 2A and 2B. Next, to characterize the morphology of SiCNPs-ENFM, a scanning electron microscope (SEM, Hitachi SU800) was used and its SEM micrographs of the fabricated conductive polymer based SiCNPs-ENFM without GOx are shown in FIG. 2C with a 25 kV acceleration voltage and 1100 magnification and 10 μm scale bars. The SEM image of FIG. 2C depict a fibrous morphology structure having an average diameter range of 110-140 nm. Correspondingly, FIG. 2D shows SEM micrographs of the fabricated conductive polymer based SiCNPs-ENFM with GOx for a 25 kV acceleration voltage, a 1100 magnification and a 10 μm scale bar. The SEM image of FIG. 2D depicts closely packed matrix like structures which facilitated higher GOx surface coverage of the nanofibrous matrix. As such, the larger surface area helped to promote the binding of the GOx enzyme within the fibrous membrane of the electrode.

Figure 3A:
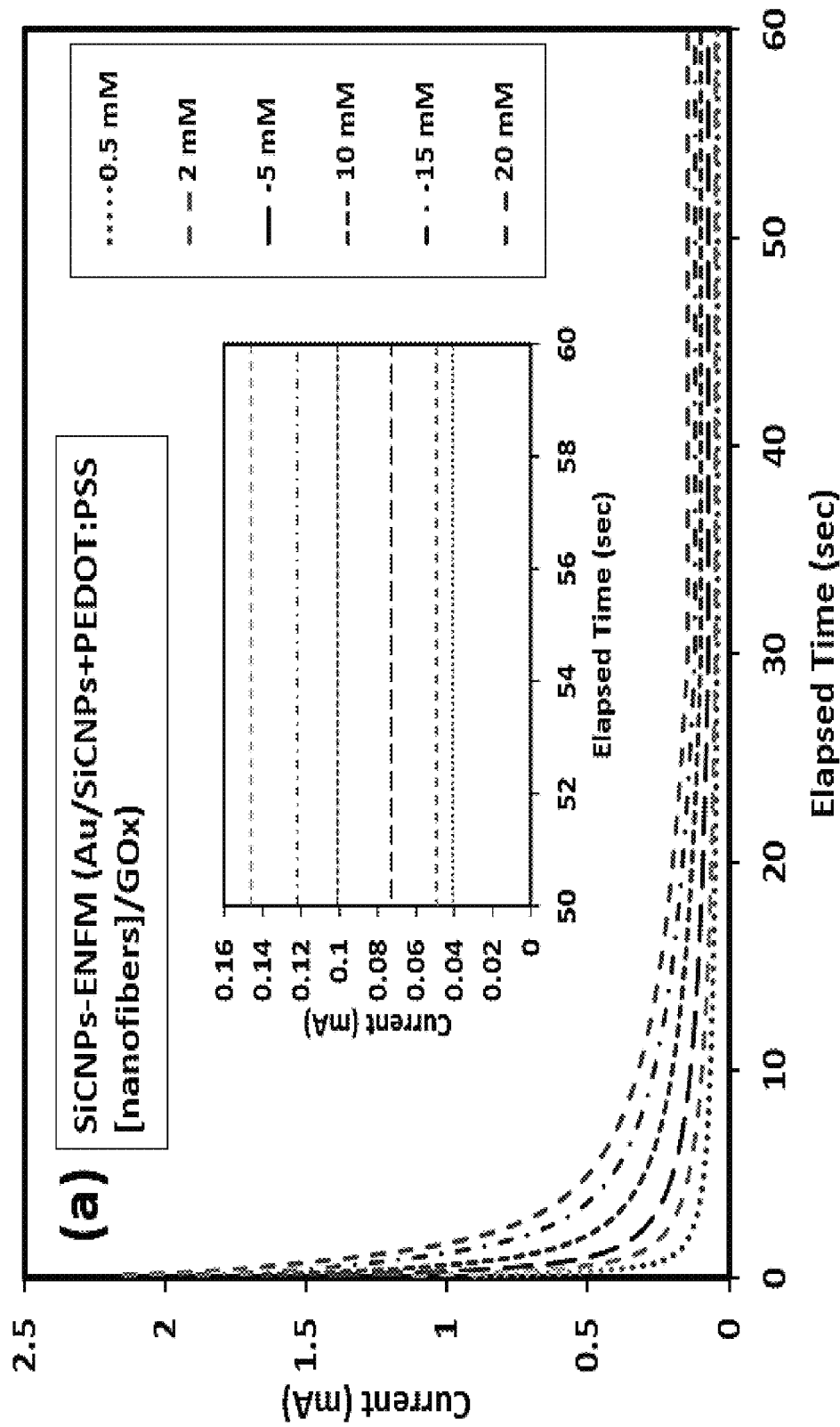
FIGS. 3A-3C show (A) chronoamperometric graphs of SiCNPs-ENFM Au/SiCNPs+PEDOT:PSS (nanofibers)/GOx electrodes at a potential+0.6 V with an elapsed time of 60 seconds; (B) a calibration plot of a current response versus varied glucose concentrations (0.5 mM to 20 mM) for SiCNPs-ENFM Au/SiCNPs+PEDOT:PSS (nanofibers)/GOx electrodes; and (C) durability measurements of a SiCNPs-ENFM electrode in accordance with various embodiments of the present disclosure.
Figure 3B:
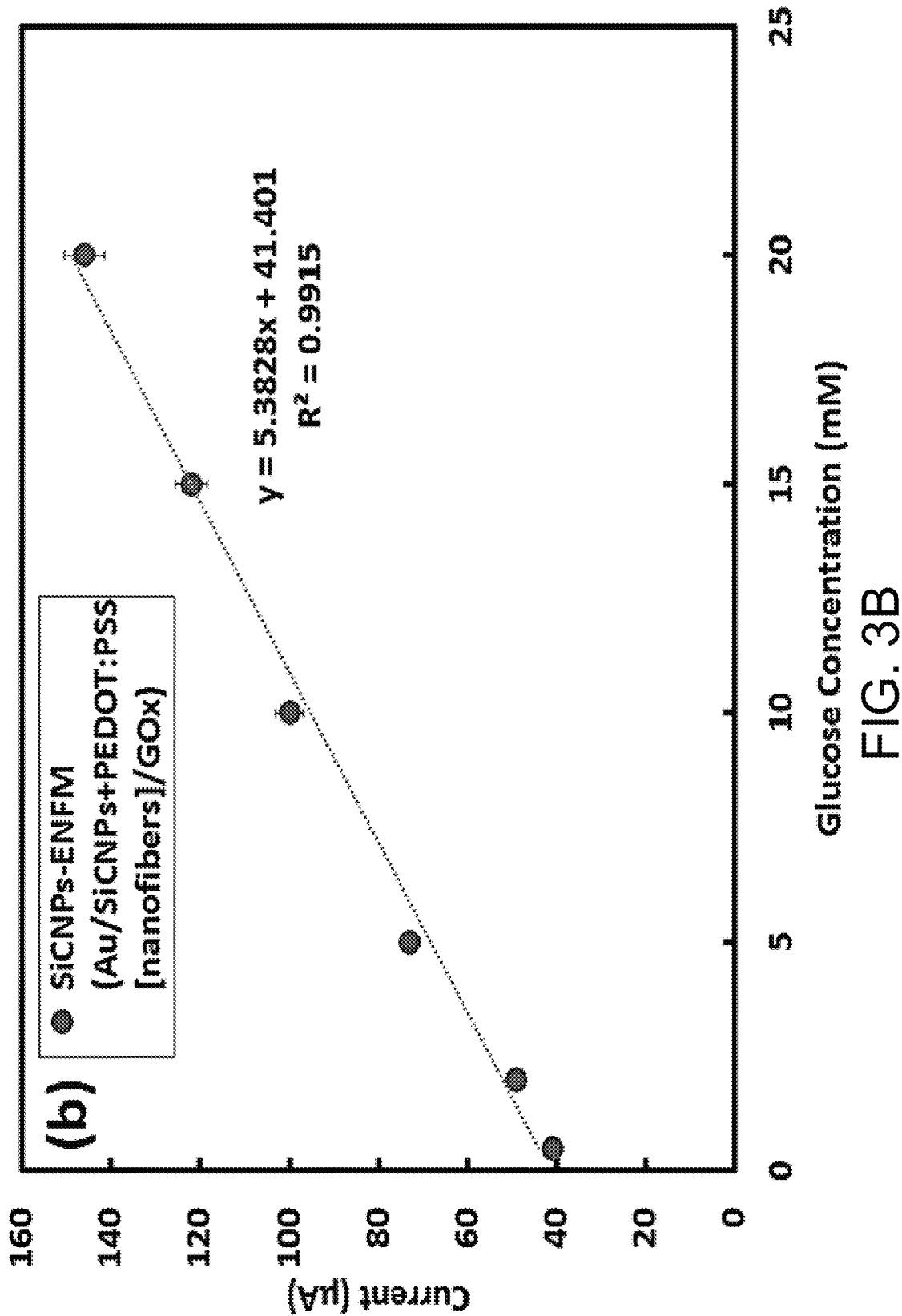

Next, FIG. 3A shows the chronoamperometric (CA) graphs of the SiCNPs-ENFM electrodes at a +0.6 V potential with 5 mM potassium ferricyanide for glucose concentration ranges from 0.5 mM to 20 mM. In the figure, the current response varies from 41.1 μA±0.0010 μA to 146.2 μA±0.0013 μA for SiCNPs-ENFM with the elapsed time of 60 seconds. From the calibration plot of FIG. 3B, the sensitivity can be calculated by the slope (5.3828 μA/mM for SiCNPs-ENFM) divided by the surface area of the sensing electrode (0.35 cm×0.5 cm) was determined to be 30.75 μA/mM cm$^2$. Correspondingly, the LOD (3*standard deviation by the slope of calibration curve) of the SiCNPs-ENFM electrode was found to be 0.56 μM.

Additionally, the durability of the SiCNPs-ENFM electrodes were measured for a 5 mM glucose concentration at +0.6 V potential, and the electrodes were refrigerated at 4°

Figure 3C:
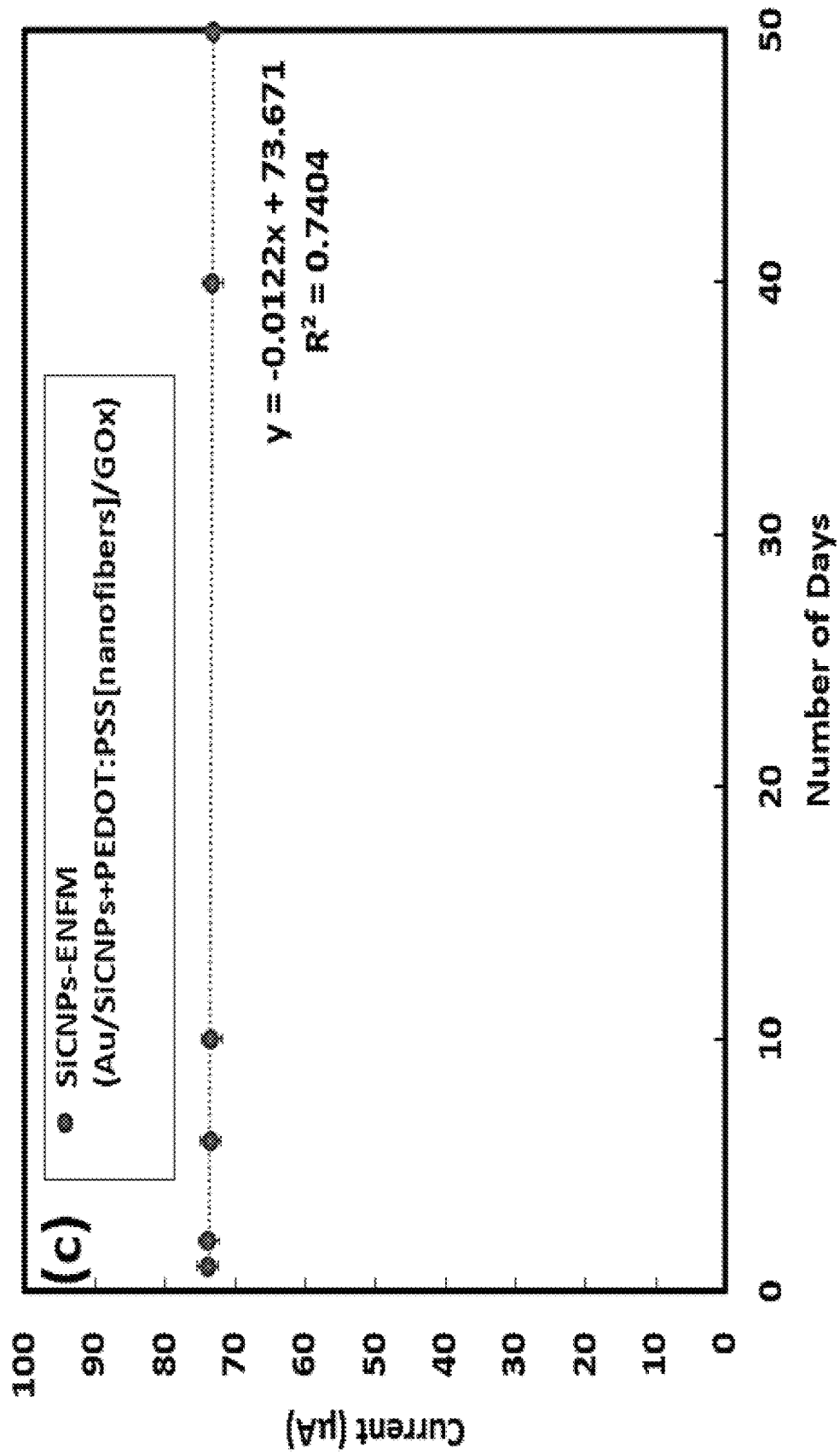

C. For an exemplary SiCNPs-ENFM electrode that was observed over a 50 day period, the CA measurements in FIG. 3C exhibit a lower change in current response of ~11%. These results indicate a good durability through strong electrochemical responses when using a SiCNPs-ENFM electrode and encourages the application of nanofibers for the fabrication of biosensors. As discussed previously, the surface structure of the SiCNPs-ENFM electrode contributes to the effective immobilization of the GOx enzyme. In particular, due to the porous structure of the compact nanofibrous matrix, GOx enzyme molecules are entrapped on the nanofibrous membrane surface of the electrode structure.

Figure 4:
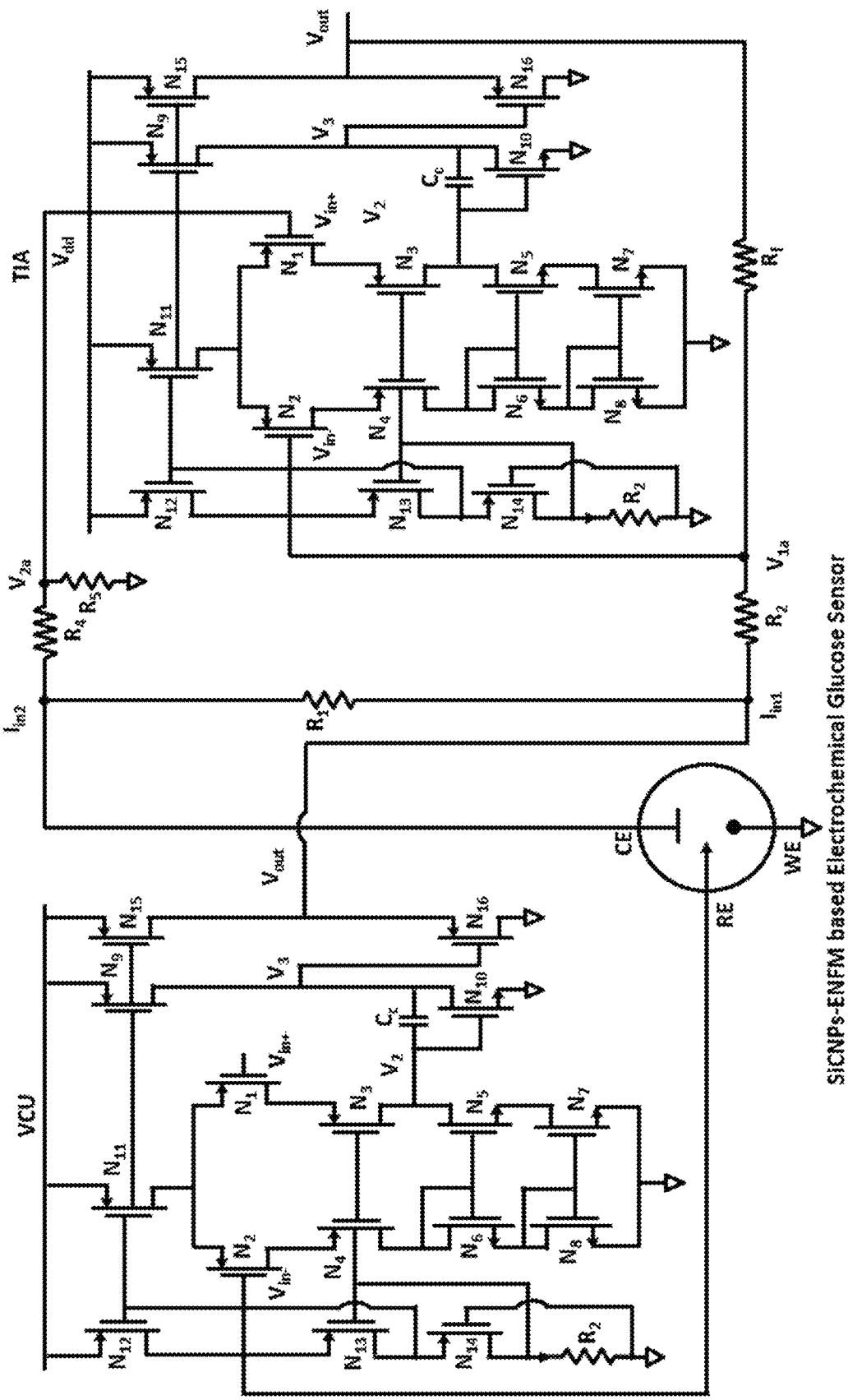
FIG. 4 shows a pictorial representation of a SiCNPs-ENFM based electrochemical enzymatic glucose sensor with a chronoamperometric potentiostat circuit in accordance with various embodiments of the present disclosure.

FIG. 4 shows a pictorial representation of an exemplary chronoamperometric potentiostat circuit design with a SiCNPs-ENFM based glucose sensor, the working electrode (WE) as a SiCNPs-ENFM sensing electrode, the reference electrode (RE) as an Ag/AgCl electrode, and the counter electrode (CE) as a gold (Au)-coated electrode. An exemplary potentiostat circuit contains both a voltage control unit (VCU) and the electrochemical current measuring/current to voltage converter unit called a transimpedance amplifier (TIA). In turn, the CE provides a path for the sensing current to the grounded WE, and the current through the cell is controlled by the potentiostat so that the reference electrode is always at the fixed potential throughout the reaction. In various embodiments, the CMOS based potentiostat circuit can be implemented using an exemplary multi-stage difference-differential telescopic cascode operational amplifier (OpAmp) configuration.

Figure 5:
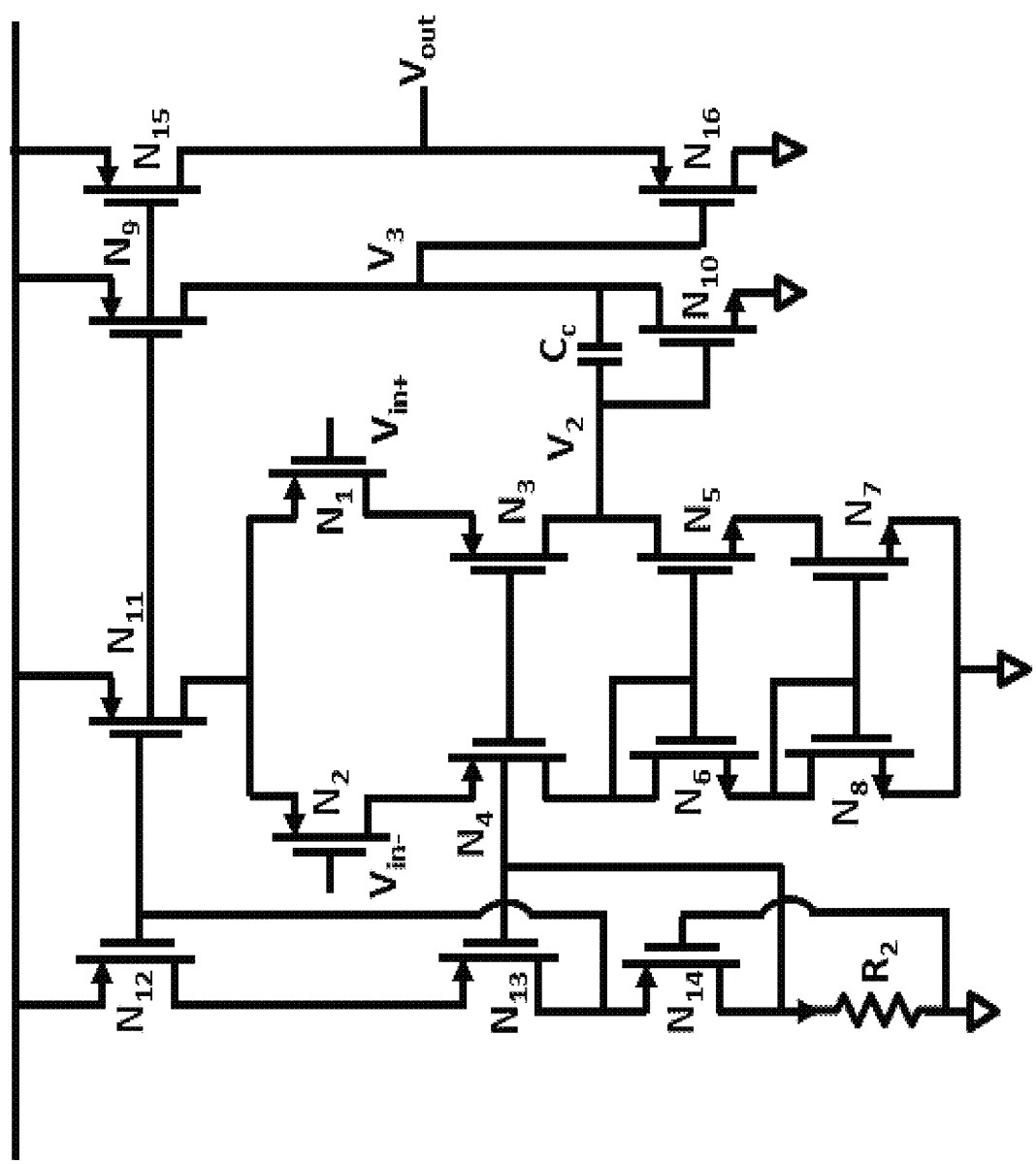
FIG. 5 shows a multi-stage difference-differential telescopic cascade operational amplifier (OpAmp) with a reference current generator and biasing circuit in accordance with various embodiments of the present disclosure.

Referring now to FIG. 5, an exemplary multi-stage difference-differential telescopic cascode OpAmp circuit is represented. In various embodiments of the design, transistors are made to operate in a saturation region to get the maximum gain, and the bias circuit is designed using the current-mirror technique, in which the sizes of current-mirrors and telescopic-cascode amplifier are the same to minimize the effect of mismatch. The exemplary circuit features a source follower circuit placed at the output of the second stage OpAmp to mitigate the loading effects and a cascode current source load placed as the cascode load. The multi-stage difference-differential telescopic cascode OpAmp configuration having $N_1$ and $N_3$ transistors has a high output resistance, and a coupling capacitor $C_c$ is used to improve the stability of the amplifier.

Figure 6:
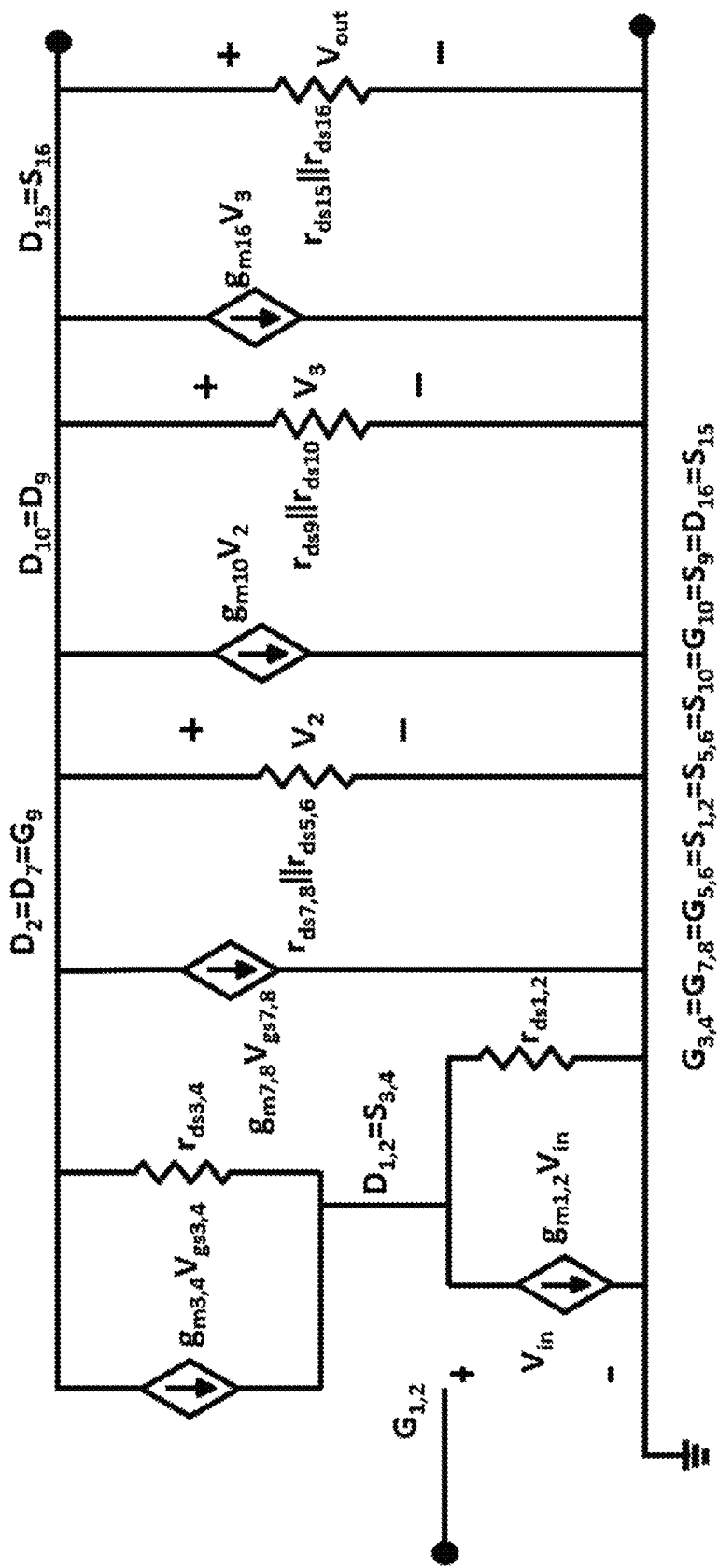
FIG. 6 shows a small signal analysis of a multi-stage difference-differential telescopic cascade OpAmp in accordance with various embodiments of the present disclosure.

FIG. 6 shows a small signal analysis of the multi-stage difference-differential telescopic cascode OpAmp, in which the small-signal output resistance $R_{out}$ for the first stage OpAmp can be found using equation (8) and the overall open-loop output impedance is shown in equation (9).

$$R_{out} = [(g_{m3,4}r_{ds3,4} + 1)r_{ds1,2} + r_{ds3,4}] \| [(g_{m5,6}r_{ds5,6} + 1)r_{ds7,8} + r_{ds5,6})] \quad (8)$$

$$R_{out} = (g_{m3,4}r_{ds3,4}r_{ds1,2}) \| (g_{m5,6}r_{ds5,6}r_{ds7,8})$$

$$Z_{out_{OL}} = \frac{V_{out}}{I_{out}} = r_{25} \| r_{26} \quad (9)$$

The open loop gain can be calculated from differential inputs $(V_{in1}-V_{in2})$ to the single-ended output $V_2$, which is shown in equation (10).

$$A_{V2} = \frac{V_2}{V_{in1} - V_{in2}} = \left(-g_{m1,2} \frac{g_{m3,4}g_{m7,8}r_{ds1,2}r_{ds3,4}r_{ds7,8}r_{ds5,6}}{g_{m3,4}r_{ds3,4}r_{ds1,2} + g_{m7,8}r_{ds7,8}r_{ds5,6}}\right) \quad (10)$$

To find the total gain of the amplifier from $V_{in}$ to $V_{out}$, a common source amplifier and source follower gain are considered. The common source amplifier gain is given as.

$$A_{V3} = -g_{m9}(r_{ds9} \| r_{ds10}) \quad (11)$$

$$A_{V3} = \frac{V_{out}}{V_2} = \left(-g_{m9} \frac{r_{ds9} \cdot r_{ds10}}{r_{ds9} + r_{ds10}}\right) \quad (12)$$

$$A_{V4} = \frac{V_{out}}{V_3} \leq 1 \quad (13)$$

After substituting equations (11), (12), and (13) in equation (14), the total open-loop gain of the multi-stage difference-differential telescopic cascode OpAmp becomes:

$$A_V = A_{V2} \cdot A_{V3} \cdot A_{V4} = \frac{V_{out}}{V_{in}} = \quad (14)$$
$$\left(-g_{m1,2} \frac{g_{m3,4}g_{m7,8}r_{ds1,2}r_{ds3,4}r_{ds7,8}r_{ds5,6}}{g_{m3,4}r_{ds3,4}r_{ds1,2} + g_{m7,8}r_{ds7,8}r_{ds5,6}}\right)\left(-g_{m9} \frac{r_{ds9} \cdot r_{ds10}}{r_{ds9} + r_{ds10}}\right)$$

Figure 7:
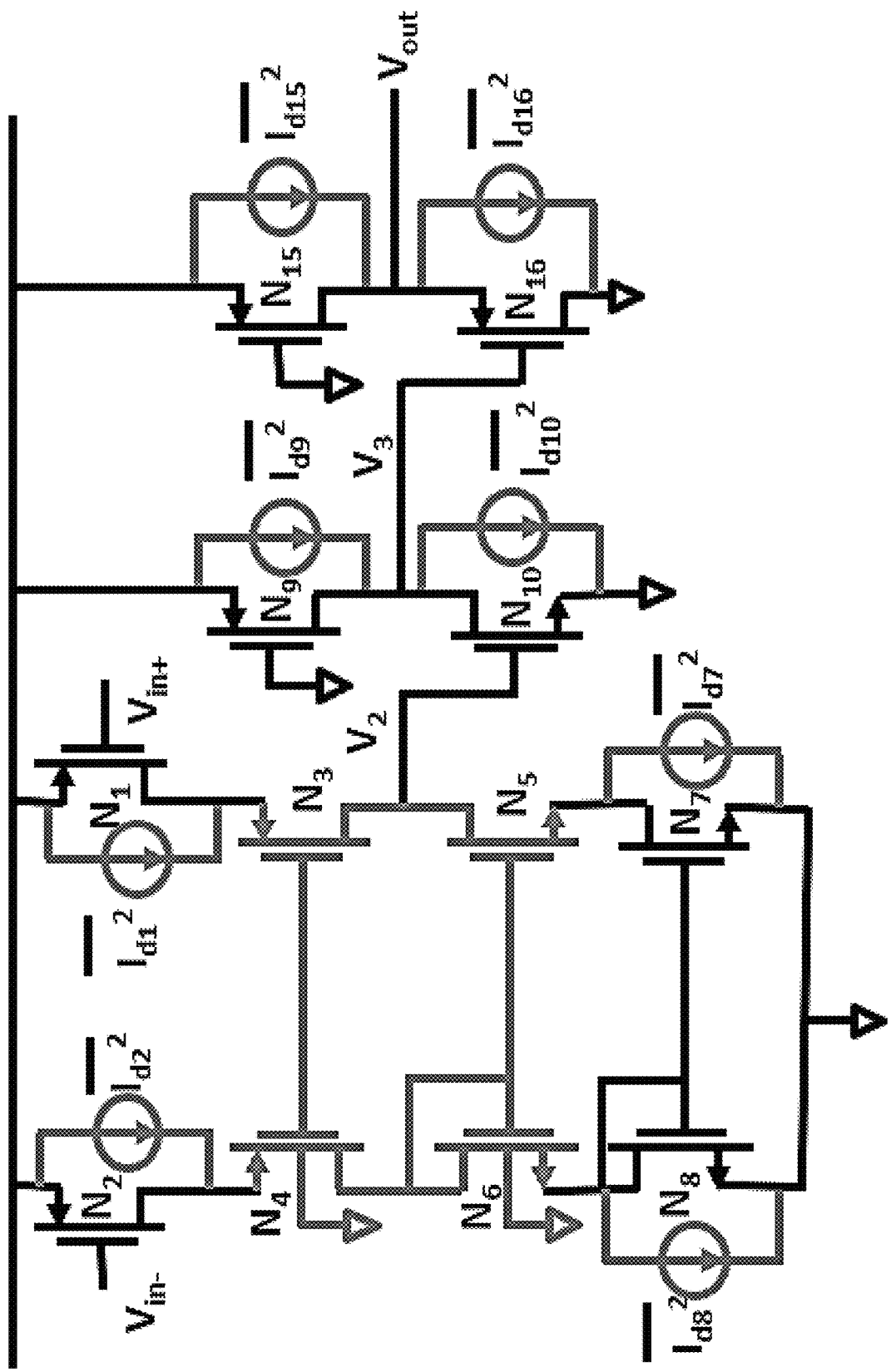
FIG. 7 shows a noise analysis of a multi-stage difference-differential telescopic cascade OpAmp in accordance with various embodiments of the present disclosure.

Next, FIG. 7 represents a noise analysis of a multi-stage difference-differential telescopic cascode OpAmp, where the primary noise sources of the amplifier are $N_1-N_2$, $N_8-N_7$, $N_{10}$, and $N_{16}$. The input-referred voltage noise can be expressed by both thermal noise and flicker noise as follows:

$$\overline{V_{n,in}^2} = 4kT\underbrace{\left(2\frac{2}{3g_{m1,2}} + 2\frac{2g_{m7,8}}{3g_{m1,2}^2} + \frac{2}{3g_{m10}} + \frac{2g_{m9}}{3g_{m10}^2} + \frac{2}{3g_{m16}} + \frac{2g_{m15}}{3g_{m16}^2}\right)}_{\text{Thermal noise}} + \quad (15)$$

$$2\frac{K_N}{C_{ox}(W \cdot L)_{1,2}} \cdot \frac{1}{f} + 2\frac{K_P}{C_{ox}(W \cdot L)_{7,8}} \cdot \frac{1}{f} \cdot \frac{g_{m7,8}^2}{g_{m1,2}^2} +$$

$$\underbrace{\frac{K_P}{C_{ox}(W \cdot L)_{10}} \cdot \frac{1}{f} + 2\frac{K_N}{C_{ox}(W \cdot L)_9} \cdot \frac{1}{f} \cdot \frac{g_{m9}^2}{g_{m10}^2} + \frac{K_P}{C_{ox}(W \cdot L)_{16}} \cdot \frac{1}{f} + \frac{K_N}{C_{ox}(W \cdot L)_{15}} \cdot \frac{1}{f} \cdot \frac{g_{m15}^2}{g_{m16}^2}}_{\text{Flicker noise}}$$

where $K_N$ and $K_P$ denote the 1/f noise coefficients of NMOS and PMOS transistors, f is the frequency, $g_m$ is the transconductance, W & L are the channel width and length of MOS transistors, and $C_{ox}$ is the gate capacitance. The output voltage of the noisy circuit when its input is open can be expressed as:

$$\overline{V_{n,out}^2} = \overline{V_{n,in}^2} \cdot A_V^2 \quad (16)$$

In this OpAmp configuration, the input transistors are PMOS transistors which have holes that are the majority charge carriers and offer less noise compared to NMOS transistors. Hence by making the PMOS transistor width larger, the input-referred noise voltage can be further minimized.

Figure 8:
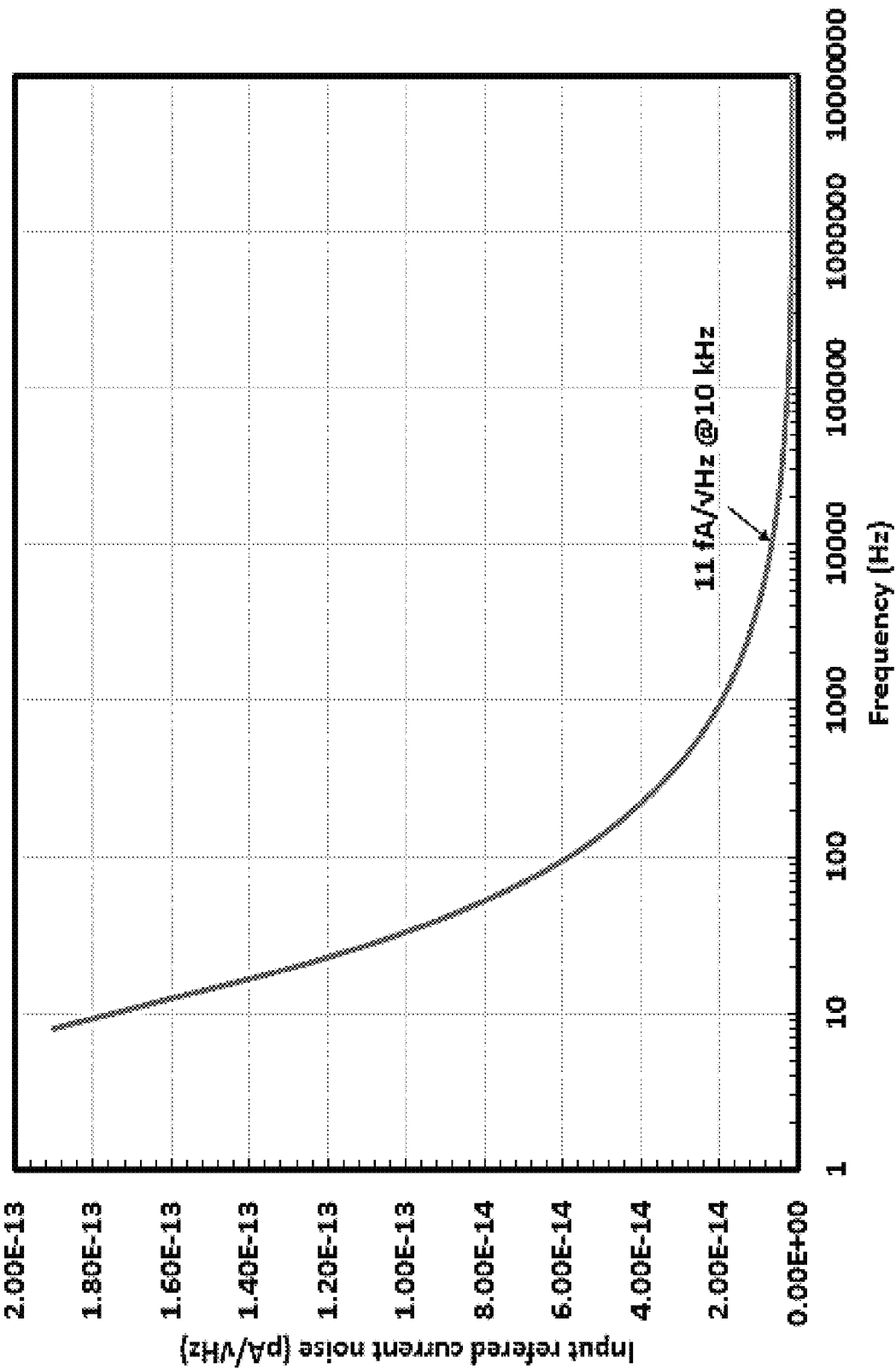
FIG. 8 shows an input-referred noise current response of an exemplary multi-stage difference-differential telescopic cascade OpAmp in accordance with various embodiments of the present disclosure.
Figure 9A:
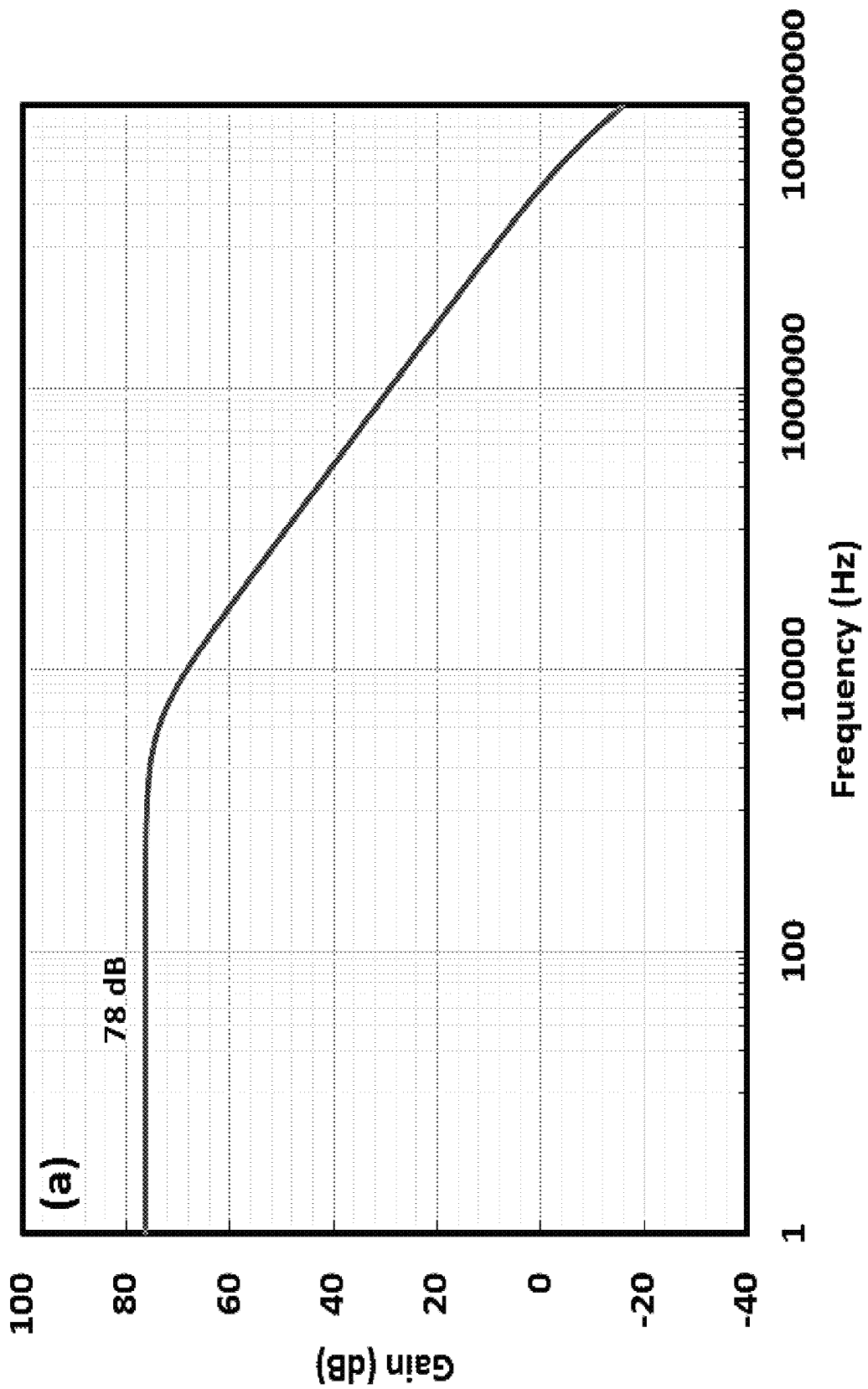
FIGS. 9A and 9B show (A) an open-loop gain and (B) a phase response of an exemplary multi-stage difference differential telescopic cascade OpAmp in accordance with various embodiments of the present disclosure.
Figure 9B:
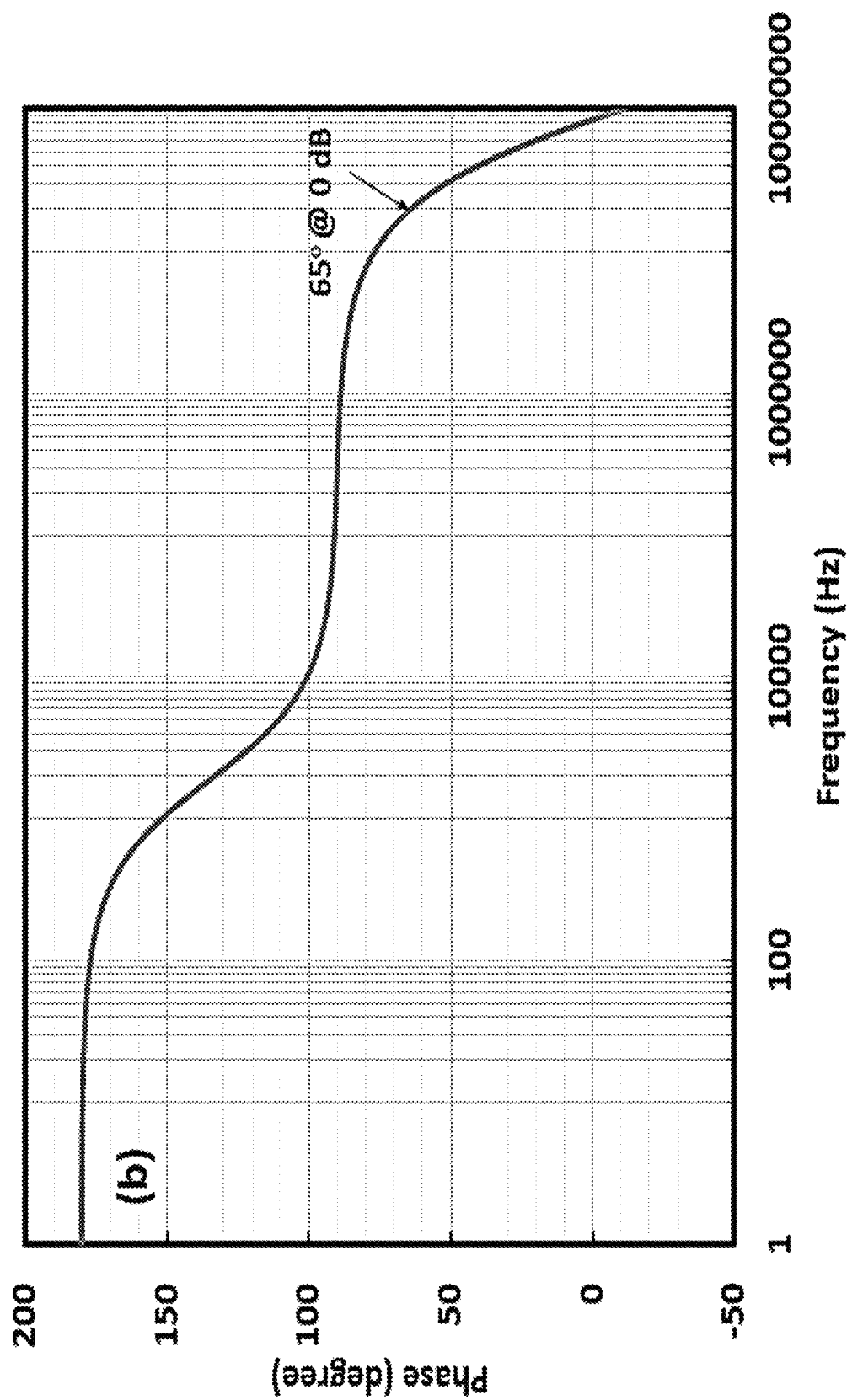

In accordance with various embodiments, an exemplary chronoamperometric potentiostat topology provides a better performance compared to previous works. In various embodiments, the VCU of an exemplary potentiostat circuit utilizes a high gain amplifier to maintain a constant voltage difference by regulating the current. Correspondingly, the TIA has a low-noise and a high gain to satisfy the output voltage swing for the maximum electrochemical current of 200 µA from the SiCNPs-ENFM sensing electrode. In various embodiments, the VCU and TIA in the potentiostat is designed using a multi-stage difference-differential telescopic cascode amplifier topology. For such a design, FIG. 8 shows that the input-referred noise current response of an exemplary multi-stage difference-differential telescopic cascode OpAmp is 11 fA/√Hz at 10 KHz. Additionally, FIGS. 9A and 9B show the simulated open loop gain and phase responses of the multi-stage difference-differential telescopic cascode OpAmp as being characterized by a 78 dB open loop gain and 65° phase margin with a 10 KHz bandwidth. Further testing provides that the total power consumption of the exemplary potentiostat is 540 µW from a single supply voltage of 1.8 V.

Table 1 (FIG. 10A) and Table 2 (FIG. 10B) represent a comparative analysis of formerly reported CMOS based potentiostats and the state-of-the-art glucose sensors. From Table 1 (FIG. 10A) and Table 2 (FIG. 10B), it can be observed that an exemplary CMOS based chronoamperometric potentiostat and the SiCNPs-ENFM glucose sensor have a significant improvement in performance showing low noise, better gain, less-power dissipation, as well as the SiCNPs-ENFM glucose sensor having better sensitivity, LOD, stability, and durability as compared to conventional CMOS based potentiostats and glucose sensors.

The present disclosure presents systems, apparatuses, and methods for glucose monitoring using a silicon-carbide-nanoparticles (SiCNPs) with conductive polymer (CP) electrospun-nanofibrous-membrane (ENFM) based electrochemical enzymatic implantable glucose sensor. In various embodiments, such SiCNPs-ENFM glucose sensors are integrated with a chronoamperometric potentiostat circuit for continuous blood glucose monitoring systems. During testing of such systems, glucose concentration was detected at +0.6 V in a 5 mM potassium ferricyanide electrolyte. After further analysis, SiCNPs with CP ENFM based glucose electrode show a wide detection range from 0.5 mM to 20 mM concentration with a better sensitivity of 30.75 µA/mM cm$^2$ and a detection limit of 0.56 µM such that the change in current level in the SiCNPs-CP-ENFM is only 11% over 50 days. The chronoamperometric analysis results demonstrate that the SiCNPs-CP-ENFM based glucose sensor provides enhanced sensitivity, better limit of detection (LOD), good stability, and durability of reliable results for glucose detection. In various embodiments, an exemplary chronoamperometric potentiostat can be implemented using a multi-stage difference-differential telescopic cascode operational amplifier configuration. Simulation results demonstrate a power consumption of 540 µW with a supply voltage of 1.8 V.

An exemplary potentiostat integrated circuit (IC), in accordance with various embodiments of the present disclosure, provides a novel design of an integrated constant reference current generator, which generates constant current independent of supply voltage variations to help bias the IC OpAmp. A voltage control unit and a transimpedance amplifier of the IC design are based on a multi-stage difference-differential telescopic cascode operational amplifier (OpAmp) configuration including low-voltage cascode current-mirror and low-noise configuration, which is designed specifically for chronoamperometric measurements. These novel component designs have never been integrated before for a potentiostat. Accordingly, fabrication of SiCNPs-ENFM as an implantable glucose sensing electrode on a single chip is the first integration of its kind.

Unique features of the novel design include having a constant reference current generator configuration (e.g., generates constant current which is independent of supply voltage variations); having a novel voltage control unit and transimpedance amplifier configuration (designed based on multi-stage difference-differential telescopic cascode operational amplifier (OpAmp) configuration which includes low-voltage cascode current-mirror technique and low-noise configuration); the incorporation of SiC nanoparticles while fabricating an electrospun nanofibrous membrane which is biocompatible and suitable for implantable glucose sensing electrode for continuous blood glucose monitoring systems; and/or the integration of a novel low-power and low-noise chronoamperometric potentiostat with a SiCNPs-ENFM based glucose sensor on a single chip for continuous blood glucose monitoring in a patient.

As a proof of concept, simulations have been performed on a Si-MOSFET based potentiostat circuit because the GPDK (Generic Process Design Kits) library was reliable for Si-MOSFET based simulation. Since SiC-MOSFETs (silicon carbide metal oxide field effect transistors) are in the market, simulations on a Si-MOSFET based potentiostat circuit showed that it is feasible for a preferred response described herein, such that there is no reason for inoperability of the SiC-MOSFET based potentiostat. In accordance with various embodiments, an exemplary glucose sensor includes a composite of a conductive polymer PEDOT:PSS with a semiconducting material (e.g., a SiCNPs nanofibrous membrane (where SiC has been established as a biocompatible material)). Hence, the sensitivity, limit of detection, response time, durability, and stability of an exemplary SiCNPs-CP-ENFM based glucose sensor is improved over those of previous sensors.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

The invention claimed is:

1. A glucose monitoring system comprising:
  a glucose monitoring sensor having at least a counter electrode, a reference electrode, and a working electrode;
  a silicon-carbide-nanoparticles-electrospun-nanofibrous-membrane contacting the working electrode;
  a glucose oxidase enzyme solution in direct contact with the silicon-carbide-nanoparticles-electrospun-nanofibrous-membrane, wherein a conductive polymer membrane assists in binding the glucose oxidase enzyme composition with the silicon-carbide-nanoparticles-electrospun-nanofibrous-membrane, and
  wherein the glucose monitoring sensor further comprises a potentiostat connected to detect a current having an amperage ranging from 2 µA to 200 µA from the working electrode, wherein the amperage is electrochemically determined within such range based on a degree of presence of glucose in contact with at least one of: the glucose oxidase enzyme solution, the conductive polymer membrane, and the silicon-carbide-nanoparticles-electrospun-nanofibrous-membrane.

2. The system of claim 1, wherein the conductive polymer membrane comprises poly(3,4-ethylenedioxythiophene):poly(styrene sulfonate).

3. The system of claim 1, wherein the potentiostat further comprises a chronoamperometric potentiostat coupled to the counter electrode, the reference electrode, and the working electrode.

4. The system of claim 3, wherein the chronoamperometric potentiostat comprises a constant reference current generator, a voltage control unit, and a transimpedance amplifier.

5. The system of claim 4, wherein the transimpedance amplifier is implemented using a multi-stage difference-differential telescopic cascade operational amplifier configuration.

6. The system of claim 4, further comprising an analog to digital converter and a digital signal processing circuit.

7. The glucose monitoring system of claim 3, wherein the chronoamperometric potentiostat comprises a silicon carbide metal oxide field effect transistor (SiC-MOSFET) based potentiostat circuit.

8. The system of claim 1, wherein the glucose monitoring sensor is composed of an Au+Cr coated glass substrate integrated with the silicon-carbide-nanoparticles-electrospun-nanofibrous-membrane and glucose oxidase enzyme solution.

9. The system of claim 1, wherein the glucose monitoring sensor has a limit of detection (LOD) of 0.56 μM.

10. The system of claim 9, wherein the glucose monitoring sensor has a sensitivity of 30.75 μA/mM cm$^2$.

11. A method comprising:
positioning a glucose oxidase enzyme solution in direct contact with a silicon-carbide-nanoparticles-electrospun-nanofibrous-membrane, wherein a conductive polymer membrane assists in binding the glucose oxidase enzyme composition with the silicon-carbide-nanoparticles-electrospun-nanofibrous-membrane; and
providing a glucose monitoring sensor having at least a counter electrode, a reference electrode, and a working electrode, wherein the working electrode contacts the silicon-carbide-nanoparticles-electrospun-nanofibrous-membrane,
coupling a potentiostat to the glucose monitoring sensor to detect an electrochemical current having an amperage ranging from 2 μA to 200 μA from the working electrode, wherein the amperage within such range is electrochemically determined and indicative of a degree of presence of glucose.

12. The method of claim 11, wherein the conductive polymer membrane comprises poly(3,4-ethylenedioxythiophene):poly(styrene sultanate).

13. The method of claim 11, wherein coupling the potentiostat further comprises coupling a chronoamperometric potentiostat coupled to the counter electrode, the reference electrode, and the working electrode.

14. The method of claim 13, wherein the chronoamperometric potentiostat comprises a constant reference current generator, a voltage control unit, and a transimpedance amplifier.

15. The method of claim 14, wherein the transimpedance amplifier is implemented using a multi-stage difference-differential telescopic cascade operational amplifier configuration.

16. The method of claim 14, further comprising receiving a sample and processing the sample to determine an analyte concentration using the glucose monitoring sensor.

17. The method of claim 16, wherein the sample is a blood sample and the analyte is glucose.

18. The method of claim 11, wherein the glucose monitoring sensor has a limit of detection (LOD) of 0.56 μM or, wherein the glucose monitoring sensor has a sensitivity of 30.75 μA/mM cm$^2$.

19. A glucose monitoring system comprising:
a glucose monitoring sensor having at least a counter electrode, a reference electrode, and a working electrode;
a silicon-carbide-nanoparticles-electrospun-nanofibrous-membrane contacting the working electrode; and
a glucose oxidase enzyme solution in direct contact with the silicon-carbide-nanoparticles-electrospun-nanofibrous-membrane,
wherein one or more glucose oxidase enzyme molecules of the glucose oxidase enzyme solution are immobilized on the silicon-carbide-nanoparticles-electrospun-nanofibrous-membrane,
wherein a conductive polymer membrane assists in binding the glucose oxidase enzyme composition with the silicon-carbide-nanoparticles-electrospun-nanofibrous-membrane,
wherein the glucose monitoring sensor comprises an Au+Cr coated glass substrate integrated with the silicon-carbide-nanoparticles-electrospun-nanofibrous-membrane and the glucose oxidase enzyme solution,
wherein the glucose monitoring system exhibits an 11% or less change in current response when stored at 4 degrees C. for 50 days,
wherein the conductive polymer membrane comprises poly(3,4-ethylenedioxythiophene):poly(styrene sulfonate),
wherein the reference electrode comprises Ag,
wherein the counter electrode comprises an Au coating,
wherein the glucose monitoring sensor further comprises a chronoamperometric potentiostat circuit configured to control a constant reference current applied to the glucose monitoring system,
wherein the chronoamperometric potentiostat circuit is coupled to detect a current having an amperage ranging from 2 μA to 200 μA at the working electrode, and
wherein the amperage within such range is electrochemically determined based on a change in electrical characteristic of the silicon-carbide-nanoparticles-electrospun-nanofibrous-membrane caused by a presence of glucose.

* * * * *